United States Patent [19]

Tokutomi et al.

[11] 4,253,751
[45] Mar. 3, 1981

[54] CAMERA FOCUS DETECTING DEVICE

[75] Inventors: Seijiro Tokutomi, Tokyo; Masao Jyojiki, Tsurugashima; Kazuo Nakamura, Higashi, all of Japan

[73] Assignee: Asahi Kogaku Kogyo Kabushiki Kaisha, Tokyo, Japan

[21] Appl. No.: 46,962

[22] Filed: Jun. 8, 1979

[30] Foreign Application Priority Data

Jun. 14, 1978 [JP] Japan .................. 53-71959

[51] Int. Cl.$^3$ .............................................. G03B 3/10
[52] U.S. Cl. ......................................... 354/25; 354/31
[58] Field of Search .................... 354/25, 31; 352/140; 355/56

[56] References Cited

U.S. PATENT DOCUMENTS

| | | | |
|---|---|---|---|
| 3,838,275 | 9/1974 | Stauffer | 354/25 |
| 3,846,629 | 11/1974 | Stauffer | 354/25 |
| 4,047,022 | 9/1977 | Holle | 354/25 |
| 4,078,171 | 3/1978 | Stauffer | 354/25 |

Primary Examiner—Michael L. Gellner
Attorney, Agent, or Firm—Sughrue, Rothwell, Mion, Zinn and Macpeak

[57] ABSTRACT

A focus detection optical system where the image of an object is divided into two images thereof, and the two images are shifted in the opposite directions or one of the two images is shifted. The two images are projected respectively onto two photoelectric conversion element groups adapted to convert the variations in relative position of the two images into electrical signals. A focus detecting device comprises: a calculating circuit for providing outputs $V_{out1}(m)$, $V_{out2}(m)$ and $V_{out3}(m)$ from the outputs of photoelectric conversion elements forming the photoelectric conversion element groups,

$$V_{out1}(m) = |\log(i'_m/i_{m+1})|$$

$$V_{out2}(m) = |\log(i_m/i'_{m+1})|$$

$$V_{out3}(m) = V_{out1}(m) - V_{out2}(m),$$

where: m=1, 2, 3, ... and (n−1), being the number in order of the photoelectric conversion elements, n is the number of the photoelectric conversion elements forming each photoelectric conversion element group, and $i_1$ through $i_n$ and $i'_1$ through $i'_n$ are the outputs of the photoelectric conversion elements which are proportional to the quantities of light applied thereto, respectively. A decision circuit is provided for determining the sign of said output $V_{out3}(m)$ and a circuit counts the number of outputs $V_{out3}(m)$ having the same sign.

13 Claims, 12 Drawing Figures

CAMERA FOCUS DETECTING DEVICE

BACKGROUND OF THE INVENTION

This invention relates to an electrical processing system in a focus detecting device using the principle of a focus adjusting method known as "a double image superimposing system". In this system, two images of an object are shifted in the opposite directions or one of the two images is shifted and the relative displacement of the two images of the object becomes zero when the correct focalization is obtained. Hence, when using this method, an electrical focus detection is achieved by means of a pair of photoelectric conversion element groups. The invention relates to a focus detecting device for a camera, in which the sign of a focus detection output is changed before and after the correct focalization is obtained.

A number of focus detecting devices have been proposed which utilize the variations in spatial frequencies or the variations in contrast of the image of an object. Recently, a variety of focus detecting devices have been provided which utilizes the principle of the above described "double image superimposing system". Some have been put in practical use.

However, most of the conventional focus detecting devices utilize the facet of this technique where the focus detection output shows a maximum value, a minimum value or an extreme value when the correct focalization is obtained. Therefore, the focus detection must be carried out over the entire focus detection range from infinity to near point for one operation of detecting the position of the correct focalization. Furthermore, since it is difficult to stop the photographing lens immediately when a correct focalization detecting signal is received from the electrical circuit, it is necessary to store the position of the photographing lens at that time instant to return the photographing lens to the position thus stored. Therefore, it is also difficult to instantaneously produce an output indicative of the correct focalization detecting signal by permitting the photographing lens to flow an object moving at high speed.

In addition, although the photographer can be informed whether or not the correct focalization is obtained, it is difficult to inform to the photographer of the state of the photographing lens when the correct focalization is not obtained. That is, the state of the photographing lens when the photographing lens is focussed on a point before the object (hereinafter referred to as "a front focalization" when applicable) and the state of the photographing lens when it is focused on a point behind the object (hereinafter referred to as "a rear focalization" when applicable) cannot be easily transmitted as an information signal. Thus, only the automatic focus detection is performed by the conventional focus detecting device. Furthermore, since the conventional focus detecting device requires a drive circuit of the photographing lens and its electric source, and the device is necessarily bulky and intricate.

The reason why the photographer, especially the beginner, has difficulty obtaining proper focus using his eyes resides in not only the fact that the functions of eyes are different among individuals but also in the fact that the display or indication of the correct focalization is effected in an analog mode. If the focalization is indicated digitally, i.e., if the front focalization, the correct focalization and the rear focalization are indicated in a digital mode, or also digitally indicated whether or not the correct focalization is obtained, then it is unnecessary to carry out automatic focus detection. Hence, a so-called "focus indicator" is sufficient for the focussing operation.

SUMMARY OF THE INVENTION

Accordingly, an object of this invention is to provide a focus detecting device for a camera, in which a focus indicator is arranged on the basis of the above-described technical concept and focalization is obtained by operating the photographing lens by the photographer.

It is another object of this invention to provide a focus detecting device where a drive circuit is unnecessary and no difference among individuals in the operation of the device results and the correct focalization can be obtained idealy.

In the case where the device is utilized as an automatic focus detecting device, it is unnecessary to make focus detection over the entire focus detecting range. Thus, the focus detecting device according to the invention is a considerable improvement in all respects over the prior art.

These and other objects of this invention are achieved in a focus detection optical system where the image of an object is divided into two images thereof, and the two images are shifted in the opposite directions or one of the two images is shifted, so that the two images are projected respectively onto two photoelectric conversion element groups adapted to convert the variations in relative position of the two images into electrical signals. A focus detecting device comprises: a calculating circuit for providing outputs $V_{out1(m)}$, $V_{out2(m)}$ and $V_{out3(m)}$, which are defined as follows, from the outputs of photoelectric conversion elements forming the photoelectric conversion element groups, $$V_{out1(m)} = |\log (i'_m/i_{m+1})|$$

$$V_{out2(m)} = |\log (i_m/i'_{m+1})|$$

$$V_{out3(m)} = V_{out1(m)} - V_{out2(m)}$$

where: $m = 1, 2, 3, \ldots$ and $n-1$, being the number in order of the photoelectric conversion elements, n is the number of the photoelectric conversion elements forming each photoelectric conversion element group, and $i_1$ through $i_n$ and $i'_1$ through $i'_n$ are the outputs of the photoelectric conversion elements which are proportional to the quantities of light applied thereto, respectively.

A decision circuit decides the sign of said output $V_{out3(m)}$; and a circuit counts the number of outputs $V_{out3(m)}$ having the same sign.

This invention will be described with reference to the accompanying drawings in detail.

BRIEF DESCRIPTION OF THE DRAWINGS

FIG. 3(c) shows the states of the object's images when the correct focalization has been obtained;

DESCRIPTION OF THE PREFERRED EMBODIMENT

Figure 1:
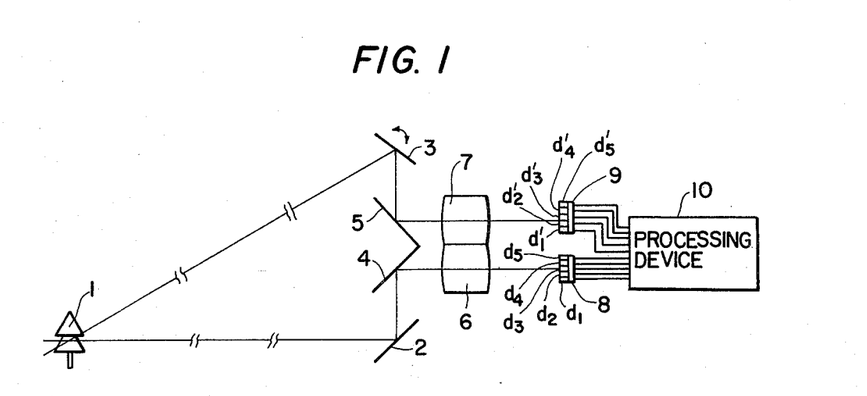
FIG. 1 is a schematic diagram showing one example of a focus detecting device for practicing a focus detecting and processing method according to this invention.

FIG. 1 is a schematic diagram showing one example of a focus detecting device suitable for a focus detecting and processing method according to the invention. In FIG. 1, reference numeral 1 designates an object; reference numerals 2, 3, 4 and 5, total reflection mirrors; and reference numerals 6 and 7, projection lenses for projecting the image of the object 1 onto photoelectric conversion element groups. Elements 8 and 9 comprises photoelectric conversion elements $d_1$, $d_2$, $d_3$, $d_4$ and $d_5$ and photoelectric conversion elements $d'_1$, $d'_2$, $d'_3$, $d'_4$ and $d'_5$, respectively. For simplification in description, the number of photoelectric conversion elements in each group is five. The photoelectric conversion elements are photo diodes. Reference numeral 10 designates an electrical processing device for achieving an electrical processing method according to the invention.

Figure 2:
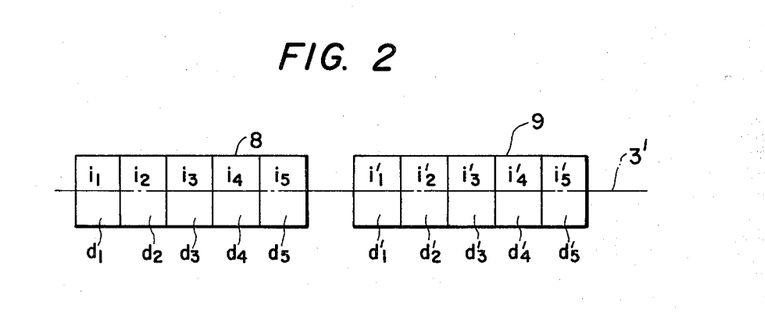
FIG. 2 is an explanatory diagram showing the arrangements of the light receiving surfaces of photoelectric conversion element groups.

FIG. 2 shows the light receiving surfaces of the photoelectric conversion elements of the photoelectric conversion element groups 8 and 9. The direction of rotation of the total reflection mirror coincides with the center line 3' of the groups 8 and 9. The light receiving surfaces of the elements are equal in dimension to one another, and the elements are equal in photoelectric characteristic to one another. Hence, the photoelectric conversion elements $d_1$ through $d_5$ correspond optically to the photoelectric conversion elements $d'_1$ through $d'_5$, respectively. Elements $d_1$ through $d_5$ and $d'_1$ through $d'_5$ provided outputs $i_1$, $i_2$, $i_3$, $i_4$ and $i_5$ and $i'_1$, $i'_2$, $i'_3$, $i'_4$ and $i'_5$, respectively, as shown in FIG. 2.

FIGS. 3(a)-(e) illustrate the movements of the object images on the photoelectric conversion element groups 8 and 9 due to the rotation in one direction of the total reflection mirror 3. More specifically, the state shown in the part (c) is obtained when the correct focalization is obtained, and the states shown in the parts (a), (b), (d) and (e) are obtained when the correct focalization is not obtained. In FIG. 3, markings ◇, ○ and △ designates parts of an object image having different brightness, which are projected onto the light receiving surfaces of the respective photoelectric conversion elements.

Figure 4:
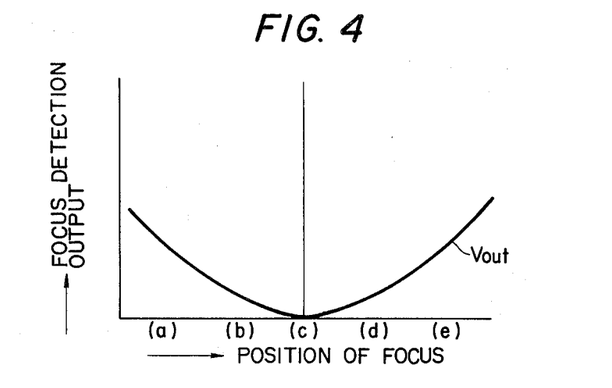
FIG. 4 is a graphical representation indicating one example of a focus detection output obtained by utilizing the conventional double image superimposing system.

FIG. 4 is a graphical representation indicating outputs in a focus detecting method employing a conventional double-image superimposing system. The horizontal axis indicates the variation of a focal position, corresponding to the movement of the total reflection mirror 3, while the vertical axis indicates the variation of a focus detection output corresponding to a focal position.

Figure 5:
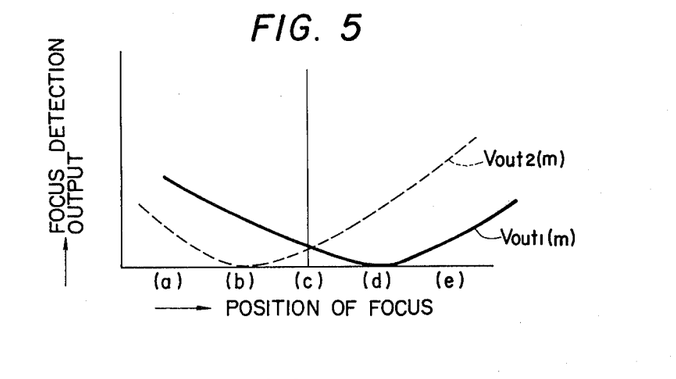
FIGS. 5 and 6 are graphical representations indicating focus detection outputs provided by a focus detecting method according to the invention.
Figure 6:
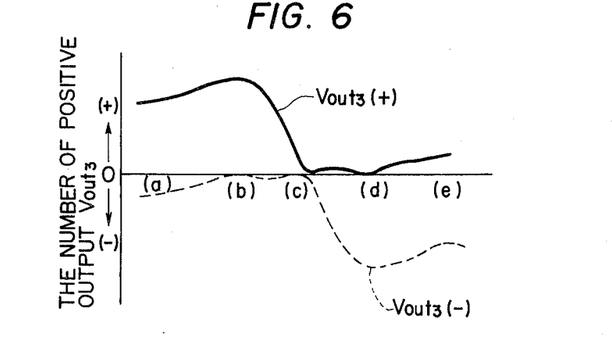

FIGS. 5 and 6 are graphical representations indicating focus detection outputs in the electrical processing method according to the invention. Symbols (a) through (e) in FIGS. 4 through 6 correspond to those (a) through (e) in FIG. 3.

Figures 7, 8, 9:
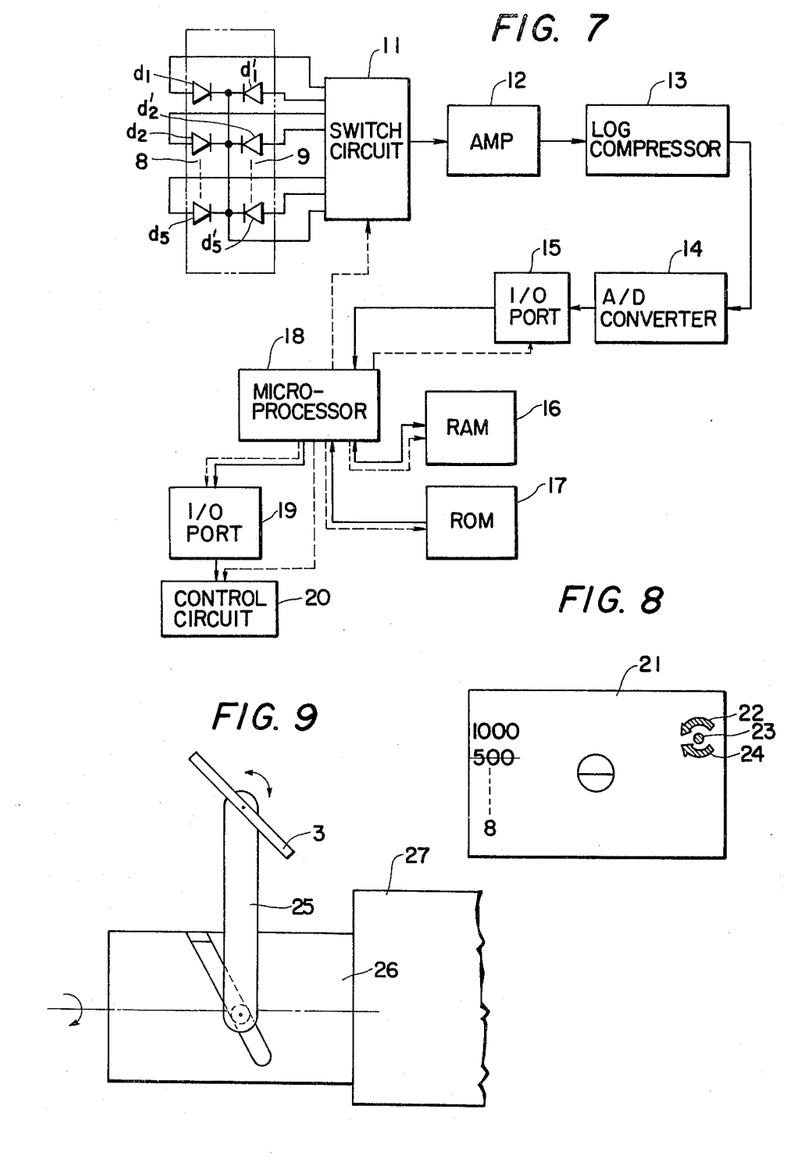
FIG. 7 is a block diagram showing one example of an electrical processing device for practicing the electrical focus detecting and processing method according to the invention.
FIG. 8 is an explanatory diagram showing one example of a view finder incorporating a focus indicator.
FIG. 9 is an explanatory diagram showing one example of a method of coupling a total reflection mirror to a photographing lens.

FIG. 7 shows one example of an electrical processing device 10 for practicing an electrical focus detecting and processing method according to the invention. The device 10 comprises a switch circuit 11, a logarithmic compression circuit 13, an amplifier circuit 12, an analog-to-digital (A/D) converter 14, and I/O port 15, a random access memory 16 (hereinafter referred to as "a RAM 16" when applicable), a read-only memory 17 (hereinafter referred to as "a ROM 17" when applicable), a micro-processor 18, and I/O port 19, and a control circuit 20 for a focus indicator and a photographing lens. In FIG. 7, the solid lines indicate the directions of application of data (which are the outputs of the photoelectric conversion elements), and the broken lines indicate the directions of application of control signals.

FIG. 8 shows one example of a view finder in which the focus indicator is provided. When the correct focalization is not obtained, a display unit 22 or 24 is operated; and when the correct focalization is obtained, a display unit 23 is operated. The display units 22, 23 and 24 are, for instance, light emission diodes.

FIG. 9 shows the connection of the total reflection mirror 3 and the photographing lens 26 to complete the focus detecting method according to the invention. That is, the total reflection mirror 3 is connected to the photographing lens 26 with a lever 25. In FIG. 9, reference numeral 27 designates a camera body.

Figure 10:
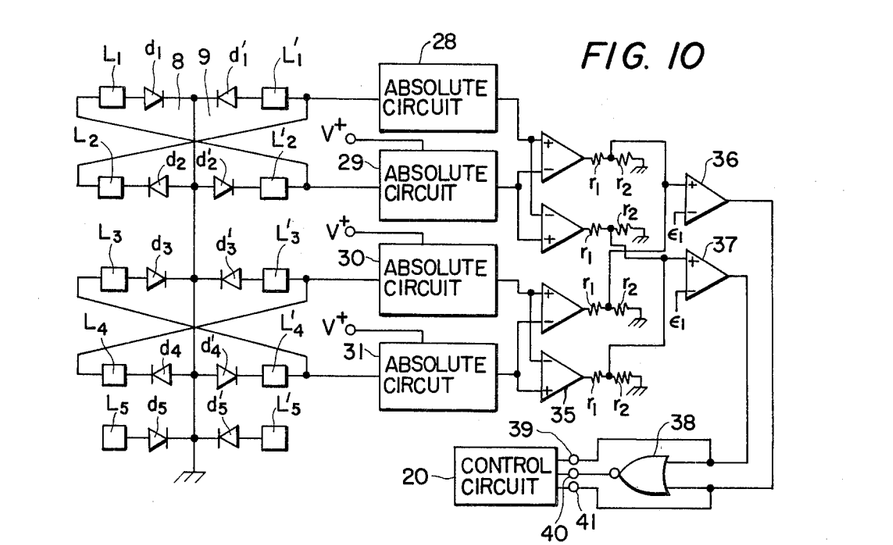
FIG. 10 is a block diagram showing another example of the electrical processing device according to the invention, in which no microprocessor and switch circuit are employed.

FIG. 10 shows another example of the electrical processing device, in which the micro-processor 18 and the switch circuit 11 in FIG. 7 are not employed. The device comprises absolute value circuits 28, 29, 30 and 31, difference circuits 32, 33, 34 and 35, comparators 36 and 37, a NOR circuit 38, and voltate dividing resistors $r_1$ and $r_2$. Reference numerals 39, 40 and 41 designate signal terminals to which signals representative of focal positions are applied. Reference character $\epsilon_1$ designates a factor for determining the range of focalization, and reference characters $L_1$ through $L_5$ and $L'_1$ through $L'_5$ designate logarithmic compression circuits.

Figure 11:
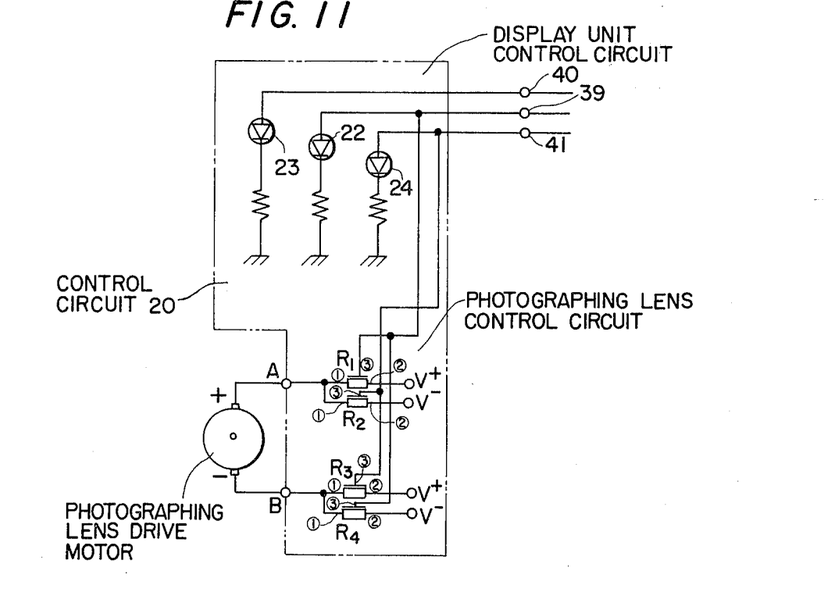
FIG. 11 is a circuit diagram showing one concrete example of a control circuit shown in FIGS. 7 and 10.

FIG. 11 is a circuit diagram showing one concrete example of the control circuit 20 shown in FIGS. 7 and 10. The control circuit 20 comprises a display unit control circuit having the display units 22 to 24 and a photographing lens control circuit having relay means $R_1$ to $R_4$. The relay means $R_1$ to $R_4$ operates, so that terminals ① and ② are short-circuited when a signal +V or a high level logic signal of "H" or "1" is applied to a terminal ③.

Figure 12:
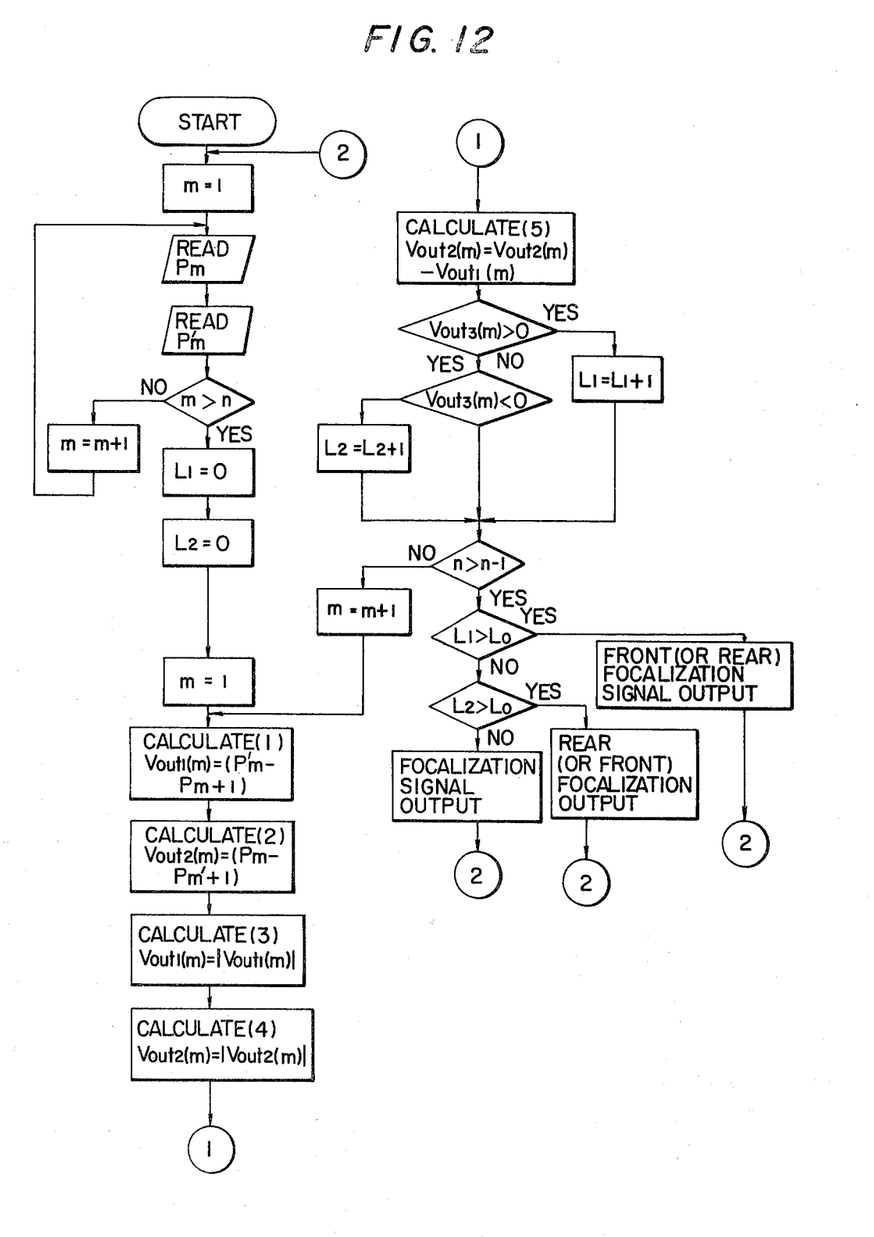
FIG. 12 is a flow chart for controlling the entire circuitry shown in FIG. 7.

FIG. 12 is a flow chart indicating the control of the entire circuitry in FIG. 7. The operation of the focus detecting device according to the invention will be described with reference to the drawings.

In FIG. 1, the image of the object 1 is projected through the total reflection mirrors 2 and 4 and the projection lens 6 onto the photoelectric conversion element group 8, while it is simultaneously projected through the total reflection mirrors 3 and 5 and the projection lens 7 onto the photoelectric conversion element group 9. The object image projected onto the photoelectric conversion element group 9 corresponds to the rotation of the total reflection mirror 3. The photoelectric conversion elements $d_1$ through $d_5$ and $d'_1$ through $d'_5$ provide outputs $i_1$ through $i_5$ and $i'_1$ through $i'_5$ corresponding to the quantities of light incident thereon, respectively. These outputs are processed by the electrical processing device 10 to detect the focus. The detail of the electrical processing device 10 according to the invention will be described hereinafter with reference to FIG. 7.

The photoelectrical conversion element groups 8 and 9 are illustrated in detail in FIG. 2. The photoelectric conversion element groups 8 and 9 are made up of the photoelectric conversion elements $d_1$ through $d_5$, and $d'_1$ through $d'_5$ arranged as shown in FIG. 2, as previously described. The position of the object image on the photoelectric conversion element group 8 is maintained unchanged irrespective of the rotation of the total reflection mirror, and the photoelectric conversion elements $d_1$ through $d_5$ provide the outputs $i_1$ through $i_5$, respectively. Although the object image is also projected onto the photoelectric conversion element group 9, this image is moved in parallel with the center line 3' as the total reflection mirror 3 is rotated. If, in this connection, the total reflection mirror 3 is rotated only in one direction, then the image is also moved in one direction. Accordingly, when the correct focalization is obtained, the object images projected onto the two groups 8 and 9 are positionally equivalent, and therefore the outputs of the corresponding photoelectric conversion elements are equal: that is, $i_1=i'_1$, $i_2=i'_2$, $i_3=i'_3$, $i_4=i'_4$ and $i_5=i'_5$.

In FIG. 3, in order to simplify the object image, parts of the object image of different brightness are indicated by the symbols $\Diamond$, $\bigcirc$ and $\triangle$. Thus, FIG. 3 is presented to show how the object image is moved with the rotation in one direction of the total reflection mirror 3.

The photoelectric conversion element group 8 is illustrated at the right-hand side of FIG. 3, and the object image thereon is not moved as was described before. Shown at the left-hand side of FIG. 3 is the variation of the object image projected onto the photoelectric conversion element group 9 when the total reflection mirror 3 is rotated in one direction so that the focal point is moved from a point behind the object to a point before the object. In this case, the position of the object image on the group is changed as indicated in FIGS. 3(a) through (e) in the stated order. FIG. 3(c) indicates that the correct focalization is obtained, that is, the position of the object image on the photoelectric conversion element group 8 is equivalent to the position of the object image of the photoelectric conversion element group 9.

It is assumed that the output of a photoelectric conversion element onto which the image of the part $\Diamond$ of the object is projected is represented by $a_1$ ($a_1>0$), the output of a photoelectric conversion element onto which the image of the part $\bigcirc$ of the object is projected is represented by $a_2$ ($a_2>0$), the output of a photoelectric conversion element onto which the image of the part $\triangle$ of the object is projected is represented by $a_3$ ($a_3>0$). Also, the output of a photoelectric conversion element onto which no object image is projected is represented by $a_0$ ($a_0>0$), and $a_1 \neq a_2 \neq a_3 \neq a_0$. In the electrical focus detecting method employing the conventional double image superimposing system, the focus detection output $V_{out}$ can be expressed as follows:

$$V_{out} = \sum_{m=1}^{n} |i_m - i_m'|$$

or, $$V_{out} = \sum_{m=1}^{n} |\log_e(i_m/i_m')| = \sum_{m=1}^{n} |\log_e i_m - \log_e i_m'|$$

where: n is the number of photoelectric conversion elements in each group, and $i_m$ and $i'_m$ are the outputs of photoelectric conversion elements $d_m$ and $d'_m$.

Hereinafter, "$\log_e$" will be expressed as "log".

Figure 3A:
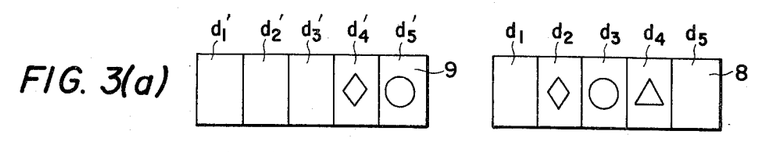
FIGS. 3(a)–(e) show various states of object's images on the photoelectric conversion element groups. More specifically, FIGS. 3(a), (b), (d) and (e) show the states of the object's images when the correct focalization is not obtained.
Figure 3B:
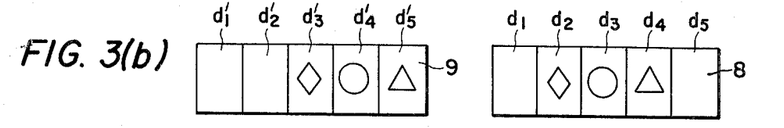
Figure 3C:
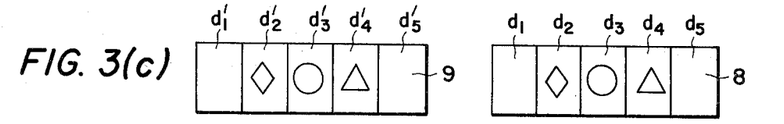
Figure 3D:
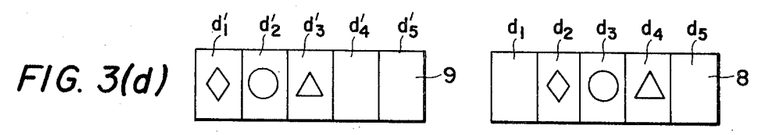
Figure 3E:
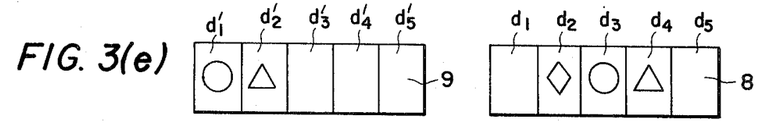

In FIG. 3, n is five (5). The focus detection outputs $V_{out}$ in FIGS. 3(a) through (e) are as follows:

(a) $V_{out} = |\log a_0 - \log a_0| + |\log a_1 - \log a_0| + |\log a_2 - \log a_0| + |\log a_3 - \log a_1| + |\log a_0 - \log a_2| > 0$ (b) $V_{out} = |\log a_0 - \log a_0| + |\log a_1 - \log a_0| + |\log a_2 - \log a_1| + |\log a_3 - \log a_2| + |\log a_0 - \log a_3| > 0$ (c) $V_{out} = |\log a_0 - \log a_0| + |\log a_1 - \log a_1| + |\log a_2 - \log a_2| + |\log a_3 - \log a_3| + |\log a_0 - \log a_0| = 0$ (d) $V_{out} = |\log a_0 - \log a_1| + |\log a_1 - \log a_2| + |\log a_2 - \log a_3| + |\log a_3 - \log a_0| + |\log a_0 - \log a_0| > 0$ (e) $V_{out} = |\log a_0 - \log a_2| + |\log a_1 - \log a_3| + |\log a_2 = \log a_0| + |\log a_3 - \log a_0| + |\log a_0 - \log a_0| > 0$ Thus, the focus detection output $V_{out}$ is zero in the case of FIG. 3(c) where the correct focalization is obtained, but it is positive in the remaining cases. That is, the focus detection output $V_{out}$ has the minimum value (0) when the focalization is obtained. In general, it is considered that the focus detection output $V_{out}$ in the case of FIG. 3(a) is greater than that $V_{out}$ in the case of FIG. 3(b) ((a)>(b)). The focus detection output $V_{out}$ in the case of FIG. 3(e) is greater than that $V_{out}$ in the case of FIG. 3(d) ((e)>(d)).

An important aspect of the invention resides not only in that detection of the focalization including the above-described front focalization and rear focalization (other than the correct, or aimed, focalization) which cannot be recognized by the above-described generalized focus detecting method can be achieved. Also, a false focalization signal produced when the image of the object is not on the same surface is eliminated.

According to an electrical processing method of the invention described below, the outputs $V_{out1(m)}$, $V_{out2(m)}$ and $V_{out3(m)}$ in the cases of FIGS. 3(a) through (e), which are defined as follows, will be obtained.

$$V_{out1(m)} = |\log(i'_m/i_m + 1)|$$

$$V_{out2(m)} = |\log(i_m/i'_m + 1)|$$

$$V_{out3(m)} = V_{out1(m)} - V_{out2(m)}$$

where: $m = 1, 2, 3, \ldots$ and $n-1$.

That is, in the focus detecting method according to the processing method of the invention, the focus detection is carried out by detecting a positive ratio and where negative and zero values of the focus detection output $V_{out3(m)}$ exist.

If it is assumed that $A_0 = \log a_0$, $A_1 = \log a_1$, $A_2 = \log a_2$ and $A_3 = \log a_3$, then the outputs $V_{out1(m)}$, $V_{out2(m)}$ and $V_{out3(m)}$ in the cases of FIGS. 3(a) through (e) are as follows:

(a) $V_{out1(1)} = |A_0 - A_1|$
$V_{out2(1)} = |A_0 - A_0|$
$V_{out3(1)} = |A_0 - A_1| > 0$
$V_{out1(2)} = |A_0 - A_2|$
$V_{out2(2)} = |A_1 - A_0|$
$V_{out3(2)} = |A_0 - A_2| - |A_1 - A_0|$
$V_{out1(3)} = |A_0 - A_3|$
$V_{out2(3)} = |A_2 - A_1|$
$V_{out3(3)} = |A_0 - A_3| - |A_2 - A_1|$
$V_{out1(4)} = |A_1 - A_0|$
$V_{out2(4)} = |A_3 - A_2|$
$V_{out3(4)} = |A_1 - A_0| - |A_3 - A_2|$ (b) $V_{out1(1)} = |A_0 - A_1|$
$V_{out2(1)} = |A_0 - A_0|$
$V_{out3(1)} = |A_0 - A_1| > 0$
$V_{out1(2)} = |A_0 - A_2|$
$V_{out2(2)} = |A_1 - A_1|$
$V_{out3(2)} = |A_0 - A_2| > 0$
$V_{out1(3)} = |A_1 - A_3|$
$V_{out2(3)} = |A_2 - A_2|$
$V_{out3(3)} = |A_1 - A_3| > 0$
$V_{out1(4)} = |A_2 - A_0|$
$V_{out2(4)} = |A_3 - A_3|$
$V_{out3(4)} = |A_2 - A_0| > 0$ (c) $V_{out1(1)} = |A_0 - A_1|$
$V_{out2(1)} = |A_0 - A_1|$
$V_{out3(1)} = 0$
$V_{out1(2)} = |A_1 - A_2|$
$V_{out2(2)} = |A_1 - A_2|$
$V_{out3(2)} = 0$
$V_{out1(3)} = |A_2 - A_3|$
$V_{out2(3)} = |A_2 - A_3|$
$V_{out3(3)} = 0$
$V_{out1(4)} = |A_3 - A_0|$
$V_{out2(4)} = |A_3 - A_0|$
$V_{out3(4)} = 0$ (d) $V_{out1(1)} = |A_1 - A_1|$
$V_{out2(1)} = |A_0 - A_2|$
$V_{out3(1)} = -|A_0 - A_2| < 0$
$V_{out1(2)} = |A_2 - A_2|$
$V_{out2(2)} = |A_1 - A_3|$
$V_{out3(2)} = -|A_1 - A_3| < 0$
$V_{out1(3)} = |A_3 - A_3|$
$V_{out2(3)} = |A_2 - A_0|$
$V_{out3(3)} = -|A_2 - A_0| < 0$
$V_{out1(4)} = |A_0 - A_0|$
$V_{out2(4)} = |A_3 - A_0|$
$V_{out3(4)} = -|A_3 - A_0| < 0$ (e) $V_{out1(1)} = |A_2 - A_1|$
$V_{out2(1)} = |A_0 - A_2|$
$V_{out3(1)} = |A_2 - A_1| - |A_0 - A_2|$
$V_{out1(2)} = |A_3 - A_2|$
$V_{out2(2)} = |A_1 - A_3|$
$V_{out3(2)} = |A_3 - A_2| - |A_1 - A_3|$
$V_{out1(3)} = |A_0 - A_3|$
$V_{out2(3)} = |A_2 - A_0|$
$V_{out3(3)} = |A_0 - A_3| - |A_2 - A_0|$
$V_{out1(4)} = |A_0 - A_0|$
$V_{out2(4)} = |A_3 - A_0|$
$V_{out3(4)} = -|A_3 - A_0| < 0$ The numbers of the outputs $V_{out3(m)}$ whose values are positive, negative and zero are as follows in the cases of FIGS. 3(a) through (e):

| | | |
|---|---|---|
| (a) | Positive value | 1 |
| | Negative value | 0 |
| | Zero value | 0 |
| | Unknown | 3 |
| (b) | Positive value | 4 |
| | Negative value | 0 |
| | Zero value | 0 |
| | Unknown | 0 |
| (c) | Positive value | 0 |
| | Negative value | 0 |
| | Zero value | 4 |
| | Unknown | 0 |
| (d) | Positive value | 0 |
| | Negative value | 4 |
| | Zero value | 0 |
| | Unknown | 0 |
| (e) | Positive value | 0 |
| | Negative value | 1 |
| | Zero value | 0 |
| | Unknown | 3 |

In the case of FIGS. 3(a) and (e), the signs of most of the focus detection outputs $V_{out3(m)}$ are unknown. However, in the case of the FIG. 3(a), the focus detection output $V_{out1(m)}$ is farther from the point where the output becomes zero (0) than the focus detection output $V_{out2(m)}$, and therefore it is considered that the probability of $V_{out1(m)} > V_{out2(m)}$ is high and accordingly the number of positive outputs $V_{out3(m)}$ is large. Similarly, in the case of part (e) it is considered that the number of negative outputs $V_{out3(m)}$ is large. In the case where the correct focalization is obtained as in FIG. 3(c), all of the focus detection outputs $V_{out3}$ are zero (0), and the number of the outputs whose values are zero is the largest. As the object image is moved from the part (c) toward the part (a), the number of positive outputs is increased. As the object image is moved from the part (c) toward the part (e), the number of negative outputs is increased.

Thus, the front focalization, the rear focalization and the correct focalization can be distinguished from one another by the comparison of the number of positive outputs, the number of negative outputs, and the number of zero outputs. If, among the above-described three different outputs, the numbers of two different outputs are known, then the number of the remaining one can be automatically known. Accordingly, all that is necessary is to detect the numbers of two different outputs among the three different outputs.

FIGS. 4 through 6 are graphical representations indicating the variations of the focus detection outputs with respect to the variations in position of the focus. In these figures, reference characters (a) through (e) correspond to those in FIG. 3, respectively.

FIG. 4 is a typical graphical representation indicating the variations of the focus detection output $V_{out}$ obtained by employing a conventional double image superimposing method. As is apparent from FIG. 4, the focus detection output has the minimum value zero (0) at the point (c) where the correct focalization is obtained and it has positive values when the position of the focus is moved right or left from the point (c).

FIG. 5 indicates the detection outputs $V_{out1(m)}$ and $V_{out2(m)}$ for providing the focus detection output $V_{out3}$ according to the invention. As is clear from the comparison between FIGS. 4 and 5, the curves $V_{out1(m)}$ and $V_{out2(m)}$ in FIG. 5 are similar in configuration to the curve $V_{out}$ in FIG. 4, but the points of their minimum values are shifted right and left, respectively. As described with reference to FIG. 3, the point where the difference between the outputs of the photoelectric conversion elements which correspond to one another if they are shifted by one position, is the point (d) for the detection output $V_{out1(m)}$ and the point (b) for the detection output $V_{out2(m)}$. At the other points, the detection outputs $V_{out1(m)}$ and $V_{out2(m)}$ follow the variations of the focus detection output $V_{out}$ in FIG. 4. As is apparent from the description made with reference to FIG. 3, the focus detection outputs $V_{out1(m)}$ and $V_{out2(m)}$ are equal to each other at point (c), and therefore the curves $V_{out1(m)}$ and $V_{out2(m)}$ intersect each other.

FIG. 6 indicates the variations of the focus detection output $V_{out3}$. The solid line indicates the number of positive outputs $V_{out3}$, and the broken line indicates the number of negative outputs $V_{out3}$.

Thus, in the focus detecting method according to the invention, the state of the focus detection output is changed before and after the correct focalization is obtained, and therefore the position of focus can be detected. The positive output $V_{out3}$ has slightly negative values at the points (c) through (e), as shown in FIG. 6. The same can be said to the negative output.

In the focus detecting method according to the invention, the object images on the groups of photoelectric conversion elements 8 and 9 must be clear to a certain extent in the range of detection, because if the object images are unclear, the $V_{out1(m)} \approx 0$ and $V_{out2(m)} \approx 0$, and accordingly $V_{out3(m)} \approx 0$. As a result, the focus detection effected erroneously. In this case, it may be considered to use the focus detecting method of the invention in combination with a method employing approximate contrast in which the sum of the absolute values of the differences between the outputs of adjacent photoelectric conversion elements is detected. However, if the lens system is additionally designed so that it has a function to permit the photographer to visually determine the focalization, the above-described problem caused when the object images on the photoelectric conversion element groups are unclear can be solved. This is because when the object images becomes unclear, the photographer can visually recognize the fact that the correct focalization is not obtained.

One example of the electrical processing device 10 for realizing the present invention is shown in FIG. 7, in which a microprocessor such as "Intel 8080" manufactured by Intel Corporation is employed for the control and computation of various circuits.

The photoelectric conversion elements of the groups 8 and 9 provide outputs proportional to the quantities of incident light. The outputs are inputted on an amplifier circuit 12 in the order specified by a switch circuit 11 controlled by a microprocessor 18. These outputs $i_1$, $i_2$ ... $i_5$, and $i'_1$, $i'_2$ ... $i'_5$ of the photoelectric conversion elements are converted into outputs $\log (i_1)$, $\log (i_2)$ ... $\log (i_5)$ and $\log (i'_1)$, $\log (i'_2)$ ... $\log (i'_5)$ by a logarithmic compression circuit 13 which operates to provide the outputs of the photoelectric conversion element in a wide range. The above-described outputs of the photoelectric conversion elements are converted from analog data to digital data by an analog-to-digital (A/D) converter 14. The digital data are applied through an I/O port 15 to a RAM 16 under the control of the microprocessor 18, and are stored in the RAM 16. The digital data thus stored are successively subjected to calculation according to a program stored in a ROM 17, and are applied through an I/O port 19 to a circuit 20 for controlling a focus indicator and a photographing lens, so that the focus detection output $V_{out3}$ is applied thereto.

FIG. 12 is the flow chart of the control program of the microprocessor 18. The control program is stored in the ROM. The order of provision of the switch circuit 11, logarithmic compression circuit 13 and amplifier circuit may be changed as required; however, the number of circuits provided in the front stage of the switch circuit 11 must be equal to the number of photoelectric conversion elements. The use of the amplifier circuit 12 is not always necessary. If logarithmic compression is carried out in the microprocessor 18, then the time required for computation is increased, the program becomes intricate, and the capacity of storage must be increased. Therefore, it is advisable that logarithmic compression is effectuated at a front stage of the A/D converter as shown in FIG. 7. In this case, the ratio of focus detection outputs can be calculated as a difference, which is considerably advantageous in the use of a processor 18, the program and the capacity of storage. That is, $\log(i_1/i'_1)$ can be converted into $\log (i_1) - \log (i'_1)$. If $\log (i_1)$ and $\log (i'_1)$ are represented by $A_1$ and $A_2$ respectively, then the expression $\log (i_1) - \log (i'_1)$ can be rewritten as $A_1 - A_2$.

In general, the outputs of the photoelectric conversion elements include various problems which must be solved. For instance, the outputs of the photoelectric conversion elements will fluctuate because of the non-uniformity in the manufacturing process and the fluctuation can be corrected if correcting data are stored in the ROM 17 to perform the following calculation. If the outputs of the photoelectric conversion elements are represented by $\alpha_1, \alpha_2 \ldots \alpha_5$ and $\alpha'_1, \alpha'_2 \ldots \alpha'_5$ with the same incident light and the outputs of the photoelectric conversion elements are represented by $i_1, i_2, \ldots i_5$ and $i'_1, i'_2, \ldots i'_5$, then the corrected outputs $P_1, P_2, \ldots P_5$ and $P'_1, P'_2, \ldots P'_5$ of the photoelectric conversion elements can be expressed by $P_1 = i_1/\alpha_1$, $P_2 = i_2/\alpha_2 \ldots P_5 = i_5/\alpha_5$, and $P'_1 = i'_1/\alpha'_1$, $P'_2 = i'_2/\alpha'_2 \ldots P'_5 = i'_5/\alpha'_5$, respectively.

If these outputs are subjected to logarithmic compression, they can be expressed as $\log (P_1) = \log (i_1) - \log (\alpha_1)$ and so forth. Therefore, if $\log (\alpha_1)$, $\log (\alpha_2)$ and so forth are stored in the ROM for correction and are substracted from the outputs of the photoelectric conversion elements subjected to logarithmic compression, then the corrected outputs can be obtained. The corrected outputs thus obtained are subjected to the predetermined calculation.

FIG. 8 shows one example of a view finder 21 having focus display units, which receives the focus detection output $V_{out3}$ and indicates the states of focalization. For instance, when any of display units 22 and 24, comprising light emission diodes is turned on, then the correct focalization is obtained by turning the photographing lens in the direction of the arrow formed by the display unit. When the correct focalization is obtained, a display unit 23 such as a light emission diode is turned on.

Thus, the focus indicator employing the present invention is excellent in visual and sensual functions when compared with the conventional focus adjusting mechanism using the eyes of the photographer.

An automatic focus detecting device can also be obtained by utilizing the above-described focus detection output $V_{out3}$ for operating (rotating, reversely rotating or stopping) and an electric motor adapted to drive the photographing lens.

FIG. 9 shows one example of a coupling mechanism employed in the case where the rotation of a photographing lens 26 is coupled through a coupling lever 25 to the rotation of the total reflection mirror 3. Hence, the total reflection mirror 3 is rotated by rotating the photographing lens with the hand of the photographer thereby to indicate the state of focalization in the finder.

FIG. 10 illustrates another example of the electrical processing device 10 in which the microprocessor and switch circuit in FIG. 7 are not employed. That is, the device in FIG. 10 is designed so that the focus detection outputs $V_{out1(m)}$, $V_{out2(m)}$ and $V_{out3(m)}$ are defined as follows:

$$V_{out1(m)} = | \log (i'_{2m-1}/i_{2m}) |$$

$$V_{out2(m)} = | \log (i_{2m-1}/i'_{2m}) |$$

$$V_{out3(m)} = V_{out1(m)} - V_{out2(m)}$$

In FIG. 10, reference characters $L_1$ through $L_5$ and $L'_1$ through $L'_5$ designate logarithmic compression circuits. Data $\log (i'_1/i_2)$, $\log (i_1/i'_2)$, $\log (i'_3/i_4)$ and $\log (i_3/i'_4)$ are applied to absolute value circuits 28, 29, 30 and 31, respectively. (In the above expressions, m=1, 2, ... and n/2). The focus detection outputs $V_{out1(l)}$ and $V_{out2(l)}$ are applied to the input terminal of the differential circuit 35. In the case of $V_{out1(1)} > V_{out2(1)}$, i.e., $V_{out3(1)} > 0$, a divided voltage is provided at the (+) input terminal of a comparator 36 by means of voltage division resistors $r_1$ and $r_2$, and $V_{out3(1)} < 0$ is obtained. That is, this output is an output component having the positive output $V_{out3}$. In the case of $V_{out1(1)} < V_{out2(1)}$; i.e., $V_{out3(1)} < 0$, an output obtained through the voltage division resistors $r_1$ and $r_2$ is applied to the (+) terminal of the comparator 37 by the differential circuit 33. That is, this output is an output component having the negative output $V_{out3}$.

Similarly, an output in the case of the positive output $V_{out3(2)}$ is applied to the comparator 36 by the differential circuit 34, and an output in the case of the negative output $V_{out3(2)}$ is applied to the comparator 37 by the differential circuit 35. In the case where both of the outputs $V_{out3(1)}$ and $V_{out3(2)}$ are positive, $2 \times r_2 \times V_0(r_1+r_2)$ is applied to the (+) terminal of the comparator 36, while 0 is applied to the comparator 37. In the case of $2 \times r_2 \times V_0(r_1+r_2) > \epsilon_1$ and $\epsilon_1 > 0$, the signal terminal has a "high" level signal, and the terminals 40 and 39 have "low" level signals, respectively, by means of the NOR circuit 38. If the combination of these signals is applied to the control circuit 20 for the focus detection indicator and the photographing lens in FIG. 7, then it is possible to operate display units 22, 23 and 24 such as light emission diodes in FIG. 8 and to control the drive circuit of the photographing lens.

When the correct focalization is obtained, i.e., when the inputs applied to the (+) terminals of the comparators 36 and 37 are smaller than the value $\epsilon_1$, then the terminal 40 has a "high" level signal. Thus, the front focalization, the rear focalization, and the correct focalization are indicated by the terminals 39, 41 and 40, respectively. The value $\epsilon_1$ is a factor defining the range of focalization. The value $V_0$ is the supply voltage. The "high" level signal is less in magnitude than the "low" level signal. The "high" level signal and the "low" level signal are voltages at both terminals of each of the differential circuits 32, 33, 34 and 35, comparators 36 and 37 and NOR circuit 38. $V_0$ is a "high" level signal.

In the example shown in FIG. 10, the number (n) of photoelectric conversion elements in the expression described above is five (5). If the number (n) is not an even number, then one pair of photoelectric conversion elements are left free. Therefore, the number (n) should be an even number.

In FIG. 11 which shows a circuit diagram showing one concrete example of the control circuit 20 shown in FIGS. 7 and 10, in the case where the "high" level signal is applied to the terminal 40, for instance, the display unit 23 is turned-on to indicate focalization. In this case, however, no relay means $R_1$ to $R_4$ are short-circuited, and therefore no potential difference between terminals A and B appears.

On the contrary, in the case where the "high" level signal is applied either to the terminal 39 or to the terminal 41, the corresponding display unit 22 or 24 is turned-on and the corresponding relay means are short-circuited. As a result, potential difference between the terminals A and B appears. The potential difference is utilized to control the operation of electric motor, i.e., the direction of rotation of motor. It should be noted that, if it is not desired to drive the photographing lens automatically, the photographing lens control circuit may be omitted.

FIG. 12 shows the flow chart of a program employed in the device shown in FIG. 7 using the microprocessor. First, the outputs, subjected to logarithmic compression, of the photoelectric conversion elements are read through the I/O port 15 in the order of $P_1$, $P'_1$, $P_2$, $P'_2$ ... $P_5$ and $P'_5$ in FIG. 7 (the number (n) of photoelectric conversion elements being five (5)) and are stored in the RAM 16. The outputs thus stored are read out of the RAM 16 in succession to obtain the difference between the outputs of the photoelectric conversion elements, whereby the outputs $V_{out1(m)}$ and $V_{out2(m)}$ are obtained. This operation corresponds to "Calculate (1)" and "Calculate (2)" in the flow chart. Then in "Calculate (3)" and "Calculate (4)", these outputs are converted into absolute values, respectively. Thereafter, the outputs thus treated are subjected to substraction to obtain the output $V_{out3(m)}$. Then, the numbers of positive and negative outputs $V_{out3(m)}$ are counted. The value $L_1$ is the number of positive outputs $V_{out3(m)}$, while the value $L_2$ is the number of negative outputs $V_{out3(m)}$.

When the value $L_1$ is larger than a value $L_0$, the front (or rear) focalization signal is produced. When the value $L_2$ is larger than the value $L_0$, the rear (or front) focalization signal is produced. When both of the values $L_1$ and $L_2$ is smaller than the value $L_0$, the correct focalization signal is produced. These signals are applied through the I/O port 19 to the control circuit 20 of the focus indicator and the photographing lens. The value $L_0$ is a factor for defining the range of focalization. The switch circuit is controlled in loading the data $P_m$ and $P'_m$, and the outputs of predetermined photoelectric conversion elements are inputted into the I/O port 15. The above-described operating cycle is repeated to adjust the position of focus.

In the flow chart, "Start" is intended to mean that a focus detecting device such as a focus detection start switch is actuated.

As is apparent from the above description, all that is required for the microprocessor are simple functions such as addition, substraction decision, and conversion of data into absolute values. In the above-described example, the number (n) of paired photoelectric conversion elements is five (5); however, the number is not limited thereto; that is, an increased number is the better to insure greater precision. A prism may be used to shift the object images in the opposite directions.

As is clear from the above description, according to the invention an electrical focus detecting device is provided which makes it possible to provide the focus indicator which can detect not only the correct focalization. This invention also makes it possible to determine the front or rear focalization, by using the focus detection output $V_{out3}$, and to provide the automatic focus detecting device, and which sufficiently follows an object moving at high speed. In addition, the electrical focus detecting device according to the invention is applicable to all types of electrical focus detecting devices utilizing the double image superimposing system and to distance meters in lens systems other than cameras. Thus, the electrical focus detecting device according to the invention has its utility in a wide range of application.

It is apparent that changes and modifications can be made without departing from the essential scope of this invention.

What is claimed is:

1. In a focus detection optical system in which the image of an object is divided into two images and at least one of the two images is shifted relative to the other and the two images are projected respectively onto two groups of photoelectric conversion element adapted to convert the variations in relative position of the two images into electrical signals, a focus detecting device for a lens system comprising:

calculating circuit means for providing outputs $V_{out1(m)}$, $V_{out2(m)}$ and $V_{out3(m)}$, from the outputs of photoelectric conversion elements forming said photoelectric conversion element groups, said outputs defined by:

$$V_{out1(m)} = |\log(i'_m/i_{m+1})|$$

$$V_{out2(m)} = |\log(i_m/i'_{m+1})|$$

$$V_{out3(m)} = V_{out1(m)} - V_{out2(m)}$$

where $m = 1, 2, 3 \ldots$ and $(n-1)$, being the number in order of said photoelectric conversion elements, n is the number of said photoelectric conversion elements forming each photoelectric conversion element group, and $i_1$ through $i_n$ and $i'_1$ through $i'_n$ are the outputs of said photoelectric conversion elements which are proportional to the quantities of light applied thereto, respectively;

means for determining the sign of said output $V_{out3(m)}$; and means for counting the number of said outputs $V_{out3(m)}$ having the same sign.

2. In a focus detection optical system in which the image of an object is divided into two images and at least one of the two images is shifted relative to the other and the two images are projected respectively onto two groups of photoelectric conversion element adapted to convert the variations in relative position of the two images into electrical signals, a focus detecting device for a lens system comprising:

calculating circuit means for providing outputs $V_{out1(m)}$, $V_{out2(m)}$ and $V_{out3(m)}$, from the outputs of photoelectric conversion elements forming said photoelectric conversion element groups, said outputs defined by:

$$V_{out1(m)} = |\log_e(i'_{2m} - 1/i_{2m})|$$

$$V_{out2(m)} = |\log_e(i_{2m} - 1/i'_{2m})|$$

$$V_{out3(m)} = V_{out1(m)} - V_{out2(m)}$$

where $m = 1, 2, 3 \ldots$ and $(n-1)$, being the number in order of said photoelectric conversion elements, n is the number of said photoelectric conversion elements forming each photoelectric conversion element group, and $i_1$ through $i_n$ and $i'_1$ through $i'_n$ are the outputs of said photoelectric conversion elements which are proportional to the quantities of light applied thereto, respectively;

circuit means for determining the sign of said output $V_{out3(m)}$; and circuit means for counting the number of said outputs $V_{out3(m)}$ having the same sign.

3. A focus detecting device as in claim 1 or 2, wherein said two images are shifted in opposite directions relative to each other.

4. A focus detecting device as in claims 1 or 2, wherein said photoelectric conversion elements in said two groups are photo-diodes.

5. A focus detecting device as in claims 1 or 2, further comprising logarithmic compression circuits receiving the outputs of said photoelectric conversion elements.

6. A focus detecting device as in claim 2, further comprising an absolute value detection circuit for each pair of photoelectric conversion elements.

7. A focus detecting device as in claim 5, further comprising a switch circuit receiving the outputs of said photoelectric conversion elements, a microprocessor gating switch circuit output to said logarithmic compression circuits, and an analog to digital convertor receiving an output from said logarithmic compression circuits and serving as a data input to said microprocessor.

8. The focus detecting device as in claim 7, further comprising a random access memory receiving data for storage from said microprocessor.

9. A focus detecting device as in claim 7, further comprising a read only memory for storing instructions for said microprocessor.

10. The focus detecting device of claims 1 or 2 further display means receiving $V_{out3(m)}$ to indicate the state of focalization of said lens system.

11. The focus detecting device of claim 10, wherein said means to indicate the state of focalization comprises first light emitting means forming a pair of arrows to indicate respectively the direction of rotation of said lens system necessary to achieve correct focus and second light emitting means to indicate when correct focus has been achieved.

12. A focus detecting device as in claim 6, wherein said circuit means for determining the sign of $V_{out3(m)}$ comprises a plurality of differential circuits, each absolute value detection circuit in a pair having its output coupled respectively to a positive input of one and a negative input of another differential circuit, voltage divider means receiving the output of said differential circuits and comparator means receiving the output of said voltage dividor means.

13. A focus detecting device as in claim 12, wherein said circuit for counting the number of said outputs comprising a NOR gate and a control circuit.

* * * * *